(12) United States Patent  
Brocheton

(10) Patent No.: US 10,815,145 B2
(45) Date of Patent: Oct. 27, 2020

(54) HIGH INDEX GLASS AND DEVICES INCORPORATING SUCH

(71) Applicant: Corning Incorporated, Corning, NY (US)

(72) Inventor: Yves Andre Henri Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/465,759

(22) Filed: Mar. 22, 2017

(65) Prior Publication Data

US 2017/0283305 A1 Oct. 5, 2017

Related U.S. Application Data

(60) Provisional application No. 62/315,969, filed on Mar. 31, 2016, provisional application No. 62/409,510, filed on Oct. 18, 2016.

(51) Int. Cl.
| | | |
|---|---|---|
| *C03C 3/095* | (2006.01) | |
| *C03C 4/02* | (2006.01) | |
| *G02B 27/01* | (2006.01) | |
| *B32B 1/00* | (2006.01) | |
| *C03C 3/097* | (2006.01) | |
| *C03C 3/068* | (2006.01) | |
| *C03C 4/08* | (2006.01) | |
| *B32B 17/06* | (2006.01) | |
| *C03C 3/062* | (2006.01) | |
| *C03C 3/112* | (2006.01) | |
| *G02B 5/22* | (2006.01) | |
| *F21V 8/00* | (2006.01) | |

(52) U.S. Cl.
CPC .............. *C03C 3/095* (2013.01); *B32B 1/00* (2013.01); *B32B 17/06* (2013.01); *C03C 3/062* (2013.01); *C03C 3/068* (2013.01); *C03C 3/097* (2013.01); *C03C 3/112* (2013.01); *C03C 4/02* (2013.01); *C03C 4/08* (2013.01); *G02B 5/226* (2013.01); *G02B 6/0016* (2013.01); *G02B 6/0035* (2013.01); *G02B 6/0065* (2013.01); *G02B 6/0076* (2013.01); *G02B 27/0101* (2013.01); *G02B 27/017* (2013.01); *G02B 27/0172* (2013.01); *C03C 2204/00* (2013.01); *G02B 2027/0112* (2013.01); *G02B 2027/0125* (2013.01); *G02B 2027/0194* (2013.01)

(58) Field of Classification Search
CPC ......... C03C 3/062; C03C 3/068; C03C 3/095; C03C 3/097; C03C 4/08
See application file for complete search history.

(56) References Cited

U.S. PATENT DOCUMENTS

| | | |
|---|---|---|
| 3,959,171 A | 5/1976 | Woodcock |
| 4,149,895 A | 4/1979 | Boudot et al. |
| 4,390,638 A | 6/1983 | Mennemann et al. |
| 4,742,028 A | 5/1988 | Boudot et al. |
| 5,525,554 A | 6/1996 | Comte |
| 6,121,176 A | 9/2000 | Comte |
| 6,184,162 B1 | 2/2001 | Speit et al. |
| 7,206,107 B2 | 4/2007 | Levola |
| 7,764,413 B2 | 7/2010 | Levola |
| 7,798,699 B2 | 9/2010 | Laitinen et al. |
| 8,180,188 B2 | 5/2012 | Mossberg et al. |
| 8,254,031 B2 | 8/2012 | Levola |
| 8,314,993 B2 | 11/2012 | Levola |
| 8,325,166 B2 | 12/2012 | Akutsu et al. |
| 8,461,070 B2 | 6/2013 | Buckett et al. |
| 8,488,246 B2 | 7/2013 | Border et al. |
| 8,547,368 B2 | 10/2013 | Levola |
| 8,989,535 B2 | 3/2015 | Robbins |
| 9,223,134 B2 | 12/2015 | Miller et al. |
| 9,250,373 B2 | 2/2016 | Kubota |
| 9,335,549 B2 | 5/2016 | Cakmakci et al. |
| 9,470,906 B2 | 10/2016 | Kaji et al. |
| 2003/0039459 A1 | 2/2003 | Brambilla et al. |
| 2010/0046070 A1 | 2/2010 | Mukawa |
| 2010/0224141 A1 | 9/2010 | Nakada |
| 2012/0033693 A1 | 2/2012 | Li et al. |
| 2012/0062998 A1 | 3/2012 | Schultz et al. |
| 2013/0314789 A1 | 11/2013 | Saarikko et al. |
| 2014/0064655 A1 | 3/2014 | Nguyen et al. |
| 2014/0078591 A1 | 3/2014 | Mukawa |
| 2015/0002528 A1 | 1/2015 | Bohn et al. |
| 2015/0247975 A1 | 9/2015 | Abovitz et al. |

(Continued)

FOREIGN PATENT DOCUMENTS

| | | | |
|---|---|---|---|
| CN | 101117267 A | * | 2/2008 |
| CN | 101117267 A | | 2/2008 |

(Continued)

OTHER PUBLICATIONS

Tapani Levola, "Diffractive Optics for Virtual Reality Displays", J. of SID, 14/5, 2006 p. 467-475.

(Continued)

*Primary Examiner* — Elizabeth A. Bolden

(74) *Attorney, Agent, or Firm* — Smit Kapadia

(57) ABSTRACT

According to at least one embodiment a glass comprises: a refractive index N of greater than 1.65 at a wavelength λ, where λ=587.6 nm; a glass density of not more than 4.2 g/cm³; Abbe number $V_d$ greater than 30; the glass comprising greater than 0.03 wt % of rare earth oxide with an atomic number of 58 or higher.

16 Claims, 9 Drawing Sheets

(56) References Cited

U.S. PATENT DOCUMENTS

| | | |
|---|---|---|
| 2015/0268415 A1 | 9/2015 | Schowengerdt et al. |
| 2015/0302659 A1 | 10/2015 | O'Conner et al. |
| 2016/0011419 A1 | 1/2016 | Gao |
| 2016/0116739 A1 | 4/2016 | TeKolste et al. |
| 2016/0219269 A1 | 7/2016 | Tekolste |
| 2016/0266387 A1 | 9/2016 | Tekolste et al. |

FOREIGN PATENT DOCUMENTS

| | | | |
|---|---|---|---|
| DE | 3534575 A1 * | 4/1986 | ............ C03C 3/061 |
| DE | 3534575 A1 | 4/1986 | |
| KR | 2015071612 A | 6/2015 | |
| RU | 2490221 C1 | 8/2013 | |
| WO | 2015192117 A1 | 12/2015 | |
| WO | 2016141372 A1 | 9/2016 | |
| WO | 2016141373 A1 | 9/2016 | |
| WO | 2016153879 A1 | 9/2016 | |

OTHER PUBLICATIONS

International Search Report and Written Opinion PCT/US2017/024665 dated Sep. 20, 2017.
International Searching Authority Invitation to Pay Additional Fees PCT/US2017/024665 dated Jun. 14, 2017.

\* cited by examiner

HIGH INDEX GLASS AND DEVICES INCORPORATING SUCH

This application claims the benefit of priority under 35 U.S.C. § 119 of U.S. Provisional Application Ser. Nos. 62/315,969 filed on Mar. 31, 2016 and 62/409,510 filed on Oct. 18, 2016, the contents of which are relied upon and incorporated hereby by reference in their entirety.

BACKGROUND

The disclosure relates generally to high index glasses, and more particularly to optical glasses which may be used in virtual or augmented reality devices.

No admission is made that any reference cited herein constitutes prior art. Applicant expressly reserves the right to challenge the accuracy and pertinency of any cited documents.

SUMMARY

One embodiment of the disclosure relates to a glass comprising: a refractive index N of greater than 1.65 at a wavelength λ=587.6 nm; a glass density of not more than 4.2 g/cm$^3$ and Abbe number $V_d$ greater than 30, the glass comprising at least 0.01 wt % (and in some embodiments at least 0.3 wt %) of at least one rare earth oxide with an atomic number 58 or higher. According to some embodiments the glass comprises at least 0.05 wt % (e.g., 0.1 wt % to 0.9 wt %) of rare earth oxide with the atomic number 58 or higher. According to some embodiments the rare earth oxide with an atomic number 58 or is at least one of: $Er_2O_3$, $Ho_2O_3$, $Pr_2O_3$, $Nd_2O_3$, or Ce oxide (e.g., $CeO_2$, $Ce_2O_3$).

According to some embodiments the glass density is 4.1 g/cm$^3$ or less, and in some embodiments not greater than 4.05 g/cm$^3$, for example 3 g/cm$^3$ to 4 g/cm$^3$. In some exemplary embodiments N, at a wavelength λ=587.6 nm, is 1.65<N≤2, for example 1.65<N≤1.9.

According to some embodiment a wearable device includes a lens comprising a glass with the refractive index N of greater than 1.65 at a wavelength λ=587.6 nm (e.g., 1.65<N≤1.9), glass density of not more than 4.2 g/cm$^3$ and Abbe number $V_d$ greater than 30, the glass comprising at least 0.01 wt % (and in some embodiments at least 0.3 wt %) of rare earth oxide with an atomic number 58 or higher. According to some embodiments the glass has $As_2O_3$ concentration in 0% wt % to 0.1 wt % range.

According to some embodiments the glass has a maximum internal transmission Tmax (%) for a wavelength within the wavelength range of 450 nm to 700 nm, and a minimum internal transmission Tmin (%) for another wavelength within said wavelength range, and Tmax/Tmin is at least 2 for at least one glass thickness within the 25 mm to 125 mm range.

According to some embodiments the glass has a minimum absorption Amin (%) for a wavelength within the wavelength range of 450 nm to 700 nm, and a maximum absorption Amax (%) for another wavelength within the wavelength range, and Amax/Amin is at least 2 for at least one glass thickness within the 25 mm to 125 mm range. For example, according to at least some embodiments 3<Amax/Amin<99 (e.g., 3 to 50) for at least one glass thickness within the 25 mm to 125 mm range.

One embodiment of the disclosure relates to a glass comprising: a refractive index (Nd) of greater than 1.65 at a wavelength λ, where λ=587.6 nm; a glass density of not more than 4.2 g/cm$^3$ and Abbe number $V_d$ greater than 30, the glass including $SiO_2$ between 5 wt % and 55 wt %, and at least 0.3 wt % of rare earth oxide with an atomic number 58 or higher. According to some embodiments the glass comprises at least 0.05 wt % (e.g., 0.1 wt % to 0.9 wt %) of rare earth oxide with atomic number 58 to 71.

According to some embodiments the glass has a maximum internal transmission Tmax for a wavelength within the wavelength range of 450 nm to 700 nm, and a minimum internal transmission Tmin for another wavelength within this wavelength range, and Tmax/Tmin is at least 2 for at least one glass thickness within the 25 mm to 125 mm range.

According to some embodiments the glass comprises $SiO_2$ between 5 wt % and 55 wt % of $SiO_2$ and at least 0.03 wt % of rare earth oxide with atomic number 58 to 71. According to some embodiments the glass comprises $SiO_2$ between 5 wt % and 55 wt % of $SiO_2$ and 0.1 wt % to 0.9 wt % of rare earth oxide with the atomic number 58 or higher.

According to at least some embodiments the glass density is in the range of 3 g/cm$^3$ to 4.05 g/cm$^3$. According to some embodiments the glass (or a glass substrate or a lens made of this glass) has glass thickness $TH_1$ wherein 0.5 mm≤$TH_1$≤2 mm (e.g., 0.5 mm, 0.6 mm, 0.7 mm, 0.75 mm, 0.9 mm, 1 mm, or therebetween) and glass thickness $TH_2$ wherein 30 mm≤$TH_2$≤300 mm (e.g., 30 mm, 40 mm, 45 mm, 52 mm, 55 mm, 60 mm, 75 mm, 100 mm, 130 mm, 150 mm or therebetween).

According to some embodiments, the amount of $SiO_2$ in the glass is 7 wt % to 45 wt %. According to some embodiments, the amount of $SiO_2$ in the glass is 13 wt % to 45 wt %. According to some embodiments, the rare earth oxide with atomic number 58 to 71 is at least one of: $Er_2O_3$, $Pr_2O_3$, $Nd_2O_3$, or cerium oxide (e.g., $CeO_2$ or $Ce_2O_3$) According to some embodiments, the glass comprises 0.05 to 0.9 wt % of $Er_2O_3$. According to some embodiments, the glass comprises 0.03 wt % to 1 wt % of $Pr_2O_3$ (e.g., 0.05 to 0.9 wt % of $Pr_2O_3$). According to some embodiments, the glass comprises 0.03 wt % to 1 wt % of $Nd_2O_3$ (e.g., 0.05 to 0.9 wt %). According to some embodiments, the glass comprises 0.03 to 0.9 wt % of Ce oxide (e.g., 0.05 to 0.9 wt % of $CeO_2$ or $Ce_2O_3$). According to some embodiments, the glass comprises 0.03 wt % to 1 wt % of $Ho_2O_3$ (e.g., 0.05 to 0.9 wt %). According to some embodiments, the total amount of $Er_2O_3$, $Ho_2O_3$, $Nd_2O_3$, $CeO_2$ and $Pr_2O_3$ in the glass is less than 1.5 wt %.

According to at least one embodiment the glass comprises: a refractive index N of greater than 1.65 at a wavelength λ, where λ=587.6 nm; glass density of not more than 4.2 g/cm$^3$; Abbe number $V_d$ greater than 30; the glass comprising in wt %, with total weight percent adding to 100%:
  $SiO_2$, 5-55 wt %
  $ZrO_2$, 5-10 wt %;
  CaO 3.5-18 wt %;
  $La_2O_3$ 0.2 wt % to 30 wt %;
  $Nb_2O_5$ 0.5 wt % to 20 wt %;
  $TiO_2$ 5-20 wt %;
  $As_2O_3$ 0% to 0.2 wt %; and
  0.03% to 0.9 wt % of rare earth dopant with an atomic number from 58 or higher (e.g., 0.03 wt % to 0.09 wt %, or 0.05 wt % to 0.09 wt % of at least one of: $Er_2O_3$ $Pr_2O_3$, $Nd_2O_3$, Ce oxide)
  others 0-1 wt %.

According to some embodiments the glass has an average (internal) transmission of at least 70% (and in some embodiments at least 75% or at least 80%) within the wavelength range of 450 nm to 700 nm for a glass thickness of 25 mm, and an internal transmission of 30% or less (and in some embodiments no more than 25%, or even less than 15%) for at least one wavelength within this wavelength range.

According to some embodiments the glass has an absorption transmission of at least 70% (and in some embodiments at least 75% or at least 80%) at least one wavelength within the wavelength range of 450 nm to 700 nm for a glass thickness of 25 mm.

According to some embodiments the glass comprises, in wt % on oxide basis:

$SiO_2$, 5-55 wt %; $ZrO_2$, 5-10 wt %; CaO 3.5-18 wt %; $La_2O_3$ 0.2 wt % to 32 wt %; $Nb_2O_5$ 0.5 wt % to 20 wt %; $As_2O_3$ 0% to 0.2 wt % and further comprising at least one of rare earth oxide with an atomic number 58 or higher. In at least some embodiments the amount of $As_2O_3$ is between 0% to 0.1 wt %, e.g., 0 to 0.05 wt %.

According to some embodiments, a light guide device comprises:
 (a) an input grating being structured and positioned to transmit light of one or more wavelengths to a glass light guide, the glass light guide structured to transmit light in one or more wavelengths within the glass light guide towards an output grating, along an optical path situated within the glass light guide between the input grating and the output grating, and
 (b) a light filtering agent situated within the glass light guide in the optical path, the glass light guide with the light filtering agent therein filtering out at least 50% of light in at least one light wavelength $\lambda a$ that propagates toward the output grating.

According to some embodiments, the glass light guide comprises greater than 0.03 wt % of at least one rare earth oxide having an atomic number of 58 or higher. According to some embodiments the glass light guide comprises at least one type of a light absorbing dopant within glass material of the light guide, light absorbing dopant being one of: $Er_2O_3$, $Ho_2O_3$, $Pr_2O_3$, $Nd_2O_3$, or $CeO_2$. According to some embodiments the wavelength $\lambda a$ is situated in 450 nm to 700 nm wavelength range, and the light glass light guide with the filtering agent therein absorbs at least 50% (e.g., at least 75%, at least 80%, at least 90%, or at least 95%) of light in the at least one light wavelength $\lambda a$ as the light propagates toward the output grating.

According to some embodiments, a multilayer light guide device comprises:
 (i) (a) a first input grating being structured and positioned to couple a first wavelength band of a visible wavelength spectrum to the a first glass light guide, the first glass light guide being structured to transmit light in the first wavelength band towards an first output grating, along a first optical path situated between the first input grating and the first output grating, and (b) a first light filtering agent situated in the first optical path between the first input grating and the first output grating, wherein the glass light guide in conjunction with the first light filtering agent is structured to filter out at least 50% of light in a least one light wavelength $\lambda a_1$ situated within the first wavelength band propagating toward the first output grating;
 (ii) (a) second glass light guide being structured to transmit light in one or more wavelengths from a second input grating towards a second output grating, along a second optical path situated between the second input grating and the second output grating; wherein the first input grating is structured and positioned to couple light to the second input grating; and the second input grating is structured and positioned to receive light coupled from the first input grating and to transmit the received light to the second glass light guide, and (b) a second light filtering agent situated in the second optical path between the second input grating and the second output grating;
  wherein the second glass light guide in conjunction with the second light filtering agent is filtering out at least 50% of light in at least one light wavelength $\lambda a_2$ that propagates toward the second output grating; and
 wavelengths $\lambda a_1$, and $\lambda a_2$ are different from one another; and
  wherein the first and second light filtering agent comprises light absorbing dopants.

In some embodiments, the first light filtering agent comprises at least one type of a light absorbing dopant, and the second light filtering agent comprises at least one other type of a light absorbing dopant. In some embodiments, the light absorbing dopants of the first light filtering agent and of the second light filtering agent are selected from: $Er_2O_3$, $Ho_2O_3$, $Pr_2O_3$, $Nd_2O_3$, or $CeO_2$ Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Augmented reality (AR) devices provide their user a live direct or indirect view of a physical, real-world environment whose elements are augmented (or supplemented) by computer-generated sensory input such as sound, video, graphics or GPS data. As a result, the technology functions by enhancing one's current perception of reality. Virtual reality devices provide a view that is computer-generated. For example, some wearable gaming devices are virtual reality devices.

Figure 1:
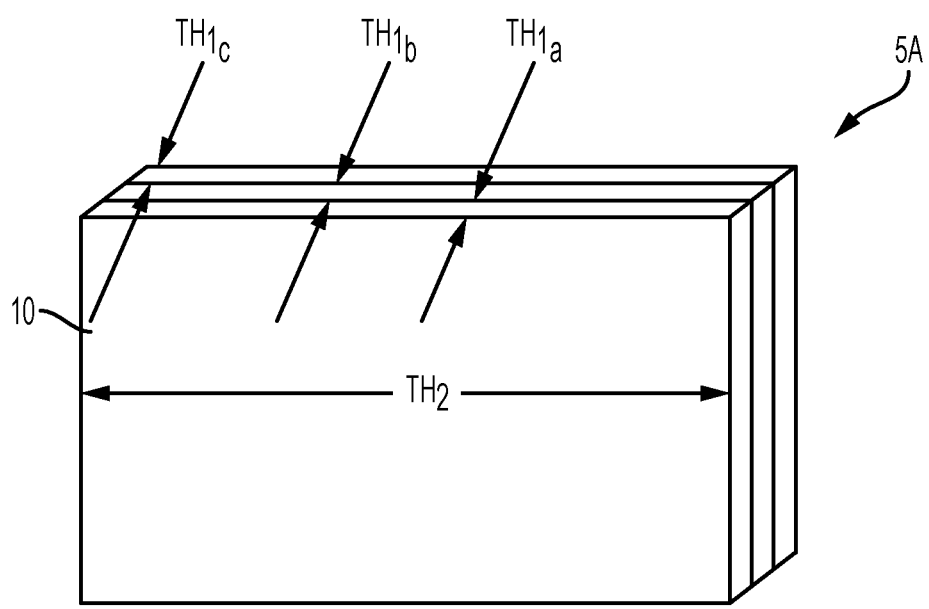
FIG. 1 illustrates schematically one exemplary embodiment of lens for a wearable device.
Figure 2:
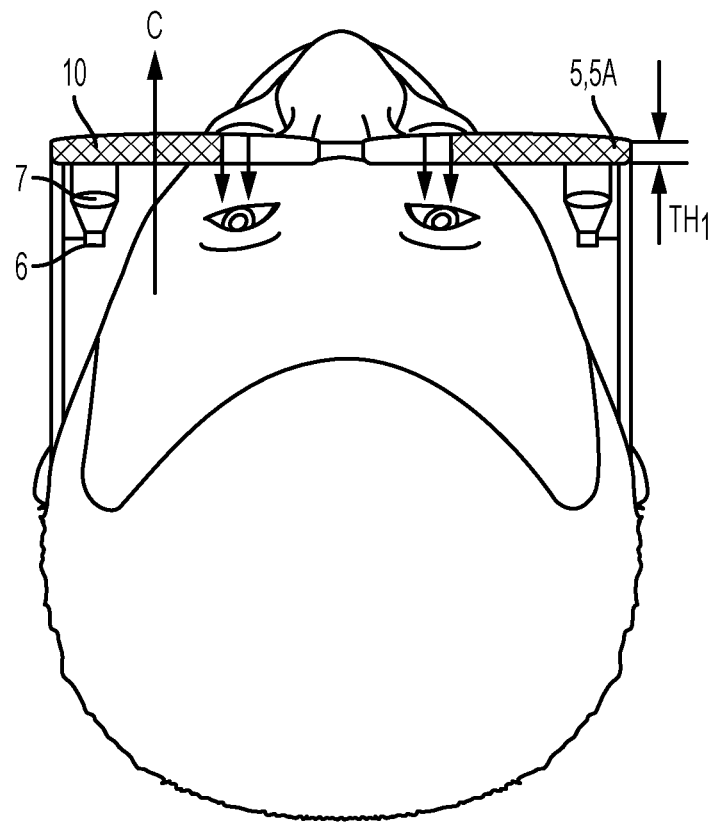
FIG. 2 illustrates schematically one example of a wearable device, according to one embodiment.

Hardware components for augmented and virtual reality devices are: processor, display, sensors and input devices. These devices utilize components such as light-emitting diode or optical waveguides (also referred herein as light guides). As an example, as shown in FIG. 1, some wearable devices may use combiner lenses 5A comprising three glass layers 5 (also referred herein as lens 5), each glass layer 5 processing light in a blue, green, or red wavelengths and each glass layer having diffractive features (or supporting a polymer layer with diffractive features). Each glass layer acts as an optical waveguide, with light propagating through the glass thickness via total internal reflection before it is viewed by the user (See FIG. 2). More specifically, a light source 6 situated above the combiner lens(es) 5A (and above the lens 5) projects light into the lens 5, for example via a lens 7, and the light (corresponding to the light that has a high transmittance value of the glass) reflects repeatedly within the glass of the lens 5 (e.g., for a distance of 20 mm to 300 mm) until it is provided to the user's eye. Thus, each lens 5 acts as a waveguide (i.e., as a light guide), transmitting to the eye(s) light provided by the light source 6. For example, in some embodiments, some wavelength(s) of light will propagate through the 25 mm to 300 mm distance within one layer of glass (associated with lens 5) before it is provided to the eye(s) of the end user, but this glass layer (lens 5) will also transmit the light through its thickness $TH_1$ all or almost all other wavelengths within the visible wavelength range to the next layer 5 (second layer of glass). In glass layer(s) 5, the thickness $TH_1$ is 2 mm or less, and preferably 1.2 mm or less, e.g., 0.3 mm to 0.9 mm, or 0.4 mm to 0.75 mm. Some of the light transmitted into the second glass layer will propagate through the 20 mm to 300 mm distance $TH_2$ within second glass layer 5, and some of the light will be transmitted to the third glass layer 5 through the thickness $TH_1$ of the second layer of glass.

A glass or a glass layer 5 that absorbs a part of the green light (or light at another specified wavelength λa) as this light propagates through the glass thickness $TH_2$, is advantageous for use in Augmented reality (AR) devices or in virtual reality devises because undesirable color mixing within the combiner lens is avoided or minimized. In some embodiments the glass layer 5 (also referred herein as the light guide or lens 5) may be structured to have optical power. In some embodiments the glass layer 5 (lens 5) is structured to have no optical power. In some embodiments the glass layer 5 (or lens 5) is a planar-planar component. In some embodiments the glass layer 5 (lens 5) has at least one curved surface. In some embodiments the glass layer 5 (lens 5) has least one planar surface. In some embodiments the glass layer 5 (lens 5) has at least two planar surfaces.

According to some embodiments the glass of lens 5 has a maximum internal absorption Amax for a wavelength within the wavelength range of 450 nm to 700 nm for a glass thickness of 25 mm, and a minimum internal absorption Amin for another wavelength within this wavelength range (for the glass thickness of 25 mm), and Amax/Amin is at least 2. In some embodiments Amax/Amin is at least 3. In some embodiments Amax/Amin is at least 4. In some embodiments Amax/Amin is at least 5, and in some embodiments the ratio of Amax to Amin is 2 and 99.9, for example between 3 and 75 or between 3 and 50 (in a 25 mm thick glass).

Please note that the absorption $A=1-T$, where T is the internal transmission.

According to some embodiments the glass of lens 5 has a maximum internal transmission Tmax for a wavelength within the wavelength range of 450 nm to 700 nm for a glass thickness of 25 mm, and a minimum internal transmission Tmin for another wavelength within this wavelength range (for the glass thickness of 25 mm), and Tmax/Tmin is at least 2. (Internal transmission of the glass is transmission of the glass without the losses due to surface contributions, such as reflections at the end surfaces with the total loss due to these reflections being typically at least of about 6% per face/surface for a 1.65 refractive index glass). In some embodiments Tmax/Tmin is at least 3. In some embodiments Tmax/Tmin is at least 4. In some embodiments Tmax/Tmin is at least 5, and in some embodiments the ratio of Tmax to Tmin is between 3 and 50 (in a 25 mm thick glass).

To measure the total transmission Ttot at any given wavelength one would measure the intensity $I_i$ of the light at a given wavelength that is incident on the glass, and then measure the intensity $I_0$ of the light exiting the glass (i.e., transmitted from the glass). The percentage of light transmitted out of the sample is the total transmission of the sample for that wavelength. To measure internal transmission we ignore the losses due to the reflection (at the two interfaces between the air and glass material) from the two end face surfaces of the glass. (The amount of reflected light R depends on the index of the glass, and surface characteristics of the glass sample, for example on how polished the surfaces are).

The internal transmission T of the glass, is measured by using standard measurement technique, below:

To measure internal transmission T, we calculate the ratio the regular transmittance (light transmitted on-axis) of two different thickness glass specimens of same glass material and surface finish. This gives a ratio of $\Delta T/\Delta x$, where $\Delta T$ is the difference in regular transmittance between the two glass specimens and $\Delta x$ is the difference between the thickness of the two glass specimens. Internal transmission T of glass for any length or glass thickness X, is then determined from $T=(\Delta T/\Delta x)^{(X/\Delta x)}$. The internal absorption A through this length or thickness X (e.g., where $X=TH_2$), is: $A=1-T$. Thus, for any given glass of a specified thickness $Amax=1-Tmin$; and $Amin=1-Tmax$. The internal transmission and internal absorption of the glass are the inherent properties of the glass material.

According to some embodiments the glass has a maximum internal transmission Tmax for a wavelength within the wavelength range of 450 nm to 700 nm for a glass thickness of 50 mm, and a minimum internal transmission Tmin for another wavelength within this wavelength range (for the glass thickness of 50 mm), and Tmax/Tmin is at least 2 for the 50 mm thick glass. In some embodiments Tmax/Tmin is at least 3. In some embodiments Tmax/Tmin is at least 4. In some embodiments Tmax/Tmin is at least 5, and in some embodiments the ratio of Tmax to Tmin is between 3 and 50 (for a 50 mm thick glass). According to some embodiments the glass has a maximum internal absorption Amax for a wavelength within the wavelength range of 450 nm to 700 nm for a glass thickness of 50 mm, and a minimum internal absorption Amin for another wavelength within this wavelength range (for the glass thickness of 50 mm), and Amax/Amin is at least 2 for the 50 mm thick glass. In some embodiments, for the 50 mm thick glass, Amax/Amin is at least 3, in some embodiments Amax/Amin is at least 4, in some embodiments Amax/Amin is at least 5, and in some embodiments the ratio of Amax to Amin is between 2 and 99.9, for example between 3 and 99, or between 3 and 75, or between 3 and 50.

According to at least some embodiments, the glass 10 of the lens 5 absorbs light in at least one wavelength within at least one of the following three wavelength ranges: a) 440-480 nm; b) and/or 495 to 560 nm; and/or c) 610-640 nm, such that the glass has: (I) transmission Tmin that is less than 30% (e.g., <20%; <15%; <10%; or even 5% or less) for least one wavelength λa within at least one of the these three wavelength ranges when the glass is 25 mm thick; or (ii) absorption Amax that is higher than 50%, and preferably higher than 70% (e.g., >80%; >75%; >90%; or even ≥95%) for least one wavelength λa within at least one of the these three wavelength ranges when the glass is 25 mm thick. According to at least some embodiments, the glass 10 absorbs light in at least one wavelength within at least one of the following three wavelength ranges: a) 440 nm to 480 nm; and/or b) 495 nm to 560 nm; and/or c) 610 nm to 640 nm, such that the glass has: (i) transmission Tmin that is less than 30% (e.g., <20%; <15%; <10%; or even 5% or less) for least one wavelength within at least one of the these three wavelength ranges when the glass is 50 mm thick; or (ii) absorption Amax that is higher than 50%, and preferably higher than 70% (e.g., >80%; >75%; >90%; or even ≥95%) for least one wavelength λa within in at least one of the these three wavelength ranges when the glass is 50 mm thick. According to at least some embodiments, the glass 10 absorbs light in at least one wavelength within at least one of the following three wavelength ranges: a) 440-480 nm; b) and/or 495 to 560 nm; and/or c) 610-640 nm, such that the glass has: (i) transmission Tmin that is less than 30% (e.g., <20%; <15%; <10%; or even 5% or less) for least one wavelength within at least one of these three wavelength ranges the 30 mm-125 mm thick glass (e.g., for 100 mm thick glass); or (ii) absorption Amax that is higher than 50%, and preferably higher than 70% (e.g., >80%; >75%; >90%; or even ≥95% within at least one of these wavelength ranges for the 30 mm-125 mm thick glass.

According to some embodiments the glass has a maximum internal transmission Tmax for a wavelength within the wavelength range of 450 nm to 700 nm for a glass thickness of 50 mm, and a minimum internal transmission Tmin (for a glass thickness of 50 mm) at another wavelength within this wavelength range, and Tmax/Tmin is at least 2. In some embodiments Tmax/Tmin is at least 3. In some embodiments Tmax/Tmin is at least 4. In some embodiments Tmax/Tmin is at least 5, and in some embodiments the ratio of Tmax to Tmin is between 3 and 50.

According to some embodiments the glass has a minimum internal absorption Amin for a wavelength within the wavelength range of 450 nm to 700 nm for a glass thickness of 50 mm, and a maximum internal absorption Amax (for a glass thickness of 50 mm) at another wavelength within this wavelength range, and Amax/Amin is at least 2. In some embodiments Amax/Amin is at least 3. In some embodiments Amax/Amin is at least 4. In some embodiments Amax/Amin is at least 5, and in some embodiments the ratio of Amax/Amin is between 3 and 50.

According to some embodiments the glass, for a glass thickness of 25 mm, the glass has an average internal transmission of at least 80% (and preferably at least 90%) in at least one 50 nm wavelength band situated within the wavelength range of 450 nm to 700 nm, and an internal transmission of 25% or less (and in some embodiments no more than 10%) for at least one wavelength λa (absorption wavelength) within this wavelength range. According to some embodiments the glass, for a glass thickness of 50 mm, has an average internal transmission of at least 80% in at least one 50 nm band within the wavelength range of 450 nm to 700 nm, and an internal transmission of 20% or less (e.g., less than 10%) for at least one wavelength within this wavelength range. According to some embodiments, for a glass thickness of 25 mm, the glass has an average absorption of at not more than 20% (and preferably not more than 15%, and in some embodiments not more than 10%) in at least one 50 nm wavelength band situated within the wavelength range of 450 nm to 700 nm, and an absorption of 75% or more (and in some embodiments no more than 90%) for at least one wavelength λa (absorption wavelength) within this range. According to some embodiments the glass, for a glass thickness of 50 mm, has an average absorption of at least not more than 20% in at least one 50 nm band within the wavelength range of 450 nm to 700 nm, and absorption of 80% or more (e.g., more than 90%) for at least one wavelength within this wavelength range.

According to some embodiments the glass has an average internal transmission of at least 80% (for example at least 85% or at least 90%) in at least one 75 nm band within the wavelength range of 450 nm to 700 nm for a glass thickness of 25 mm, and an internal transmission of 25% or less (and in some embodiments less than 10% or even less than 5%) for at least one wavelength λa within this wavelength range. According to some embodiments the glass has an average internal transmission of at least 80% in at least a 75 nm band within the wavelength range of 450 nm to 700 nm for a glass thickness of 50 mm, and an internal transmission of 20% or less (e.g., less than 10%) for at least one wavelength within this wavelength range. For example, in some embodiments the glass may have an internal transmission of over 90% in at least a 75 nm band within the wavelength range of 450 nm to 700 nm for a glass thickness of 50 mm, and an internal transmission of 1 to 5% for at least one wavelength outside this band (but within the 450 nm to 700 nm wavelength range).

Figure 3:
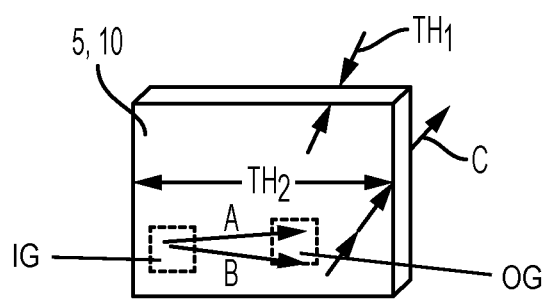
FIG. 3 illustrates schematically another exemplary embodiment of lens for a wearable device.

FIG. 3 illustrates light that propagates, for example, from the input grating IG to the output grating OG in the direction of arrows A and B. As illustrated in FIG. 3, the embodiments of the glasses 10 with these transmission characteristics will absorb a large amount of light in a wavelength λa that is propagating in the first or second direction as indicated by the arrows A and B through the thickness $TH_2$ of the glass (where the thickness of the glass is at least 25 mm), but will absorb very little of the light in wavelength λa when the light is propagating in the third direction (in the direction of the arrow C) through the glass thickness $TH_1$ that is 2 mm or less. Accordingly the light in the wavelength λa can propagate through the glass into the next glass layer of the lens, but is filtered when it is propagating in a different direction such that it propagates through at least a 25 mm (e.g., 30 mm, 40 mm, 50 mm, or 60 mm) thickness $TH_2$. Similarly, when a plurality of combiner lenses 5A are stacked forming a plurality of layers (e.g., three glass layers 5 shown, for example, in FIG. 3, each glass layer (or the light guide 5) acts as a filtering optical waveguide, with light propagating through the glass thickness via total internal reflection before it is viewed by the user.

Thus, according to one embodiment, a multilayer light guide device comprises:

(a) a first input grating IG being structured and positioned to couple a first wavelength band of a visible wavelength spectrum to the a glass light guide, the first glass light guide being structured to transmit light in the first wavelength band towards an first output grating, along a first optical path situated between the first input grating IG and the first output grating OG, and (b) a first light filtering agent situated in the first optical path between the first input grating and the first output grating, wherein the glass light guide in conjunction with the first light filtering agent is structured to filter out at least 50% of light in a least one light wavelength $\lambda a_1$ situated within the first wavelength band propagating toward the first output grating;

(ii) (a) second glass light guide being structured to transmit light in one or more wavelengths from a second input grating IG towards a second output grating OG, along a second optical path situated between the second input grating and the second output grating; wherein the first input grating is structured and positioned to couple light to the second input grating; and the second grating is structured and positioned to receive light coupled from the first input grating and to transmit the received light to the second glass light guide, and (b) a second light filtering agent situated in the second optical path between the second input grating and the second output grating;

wherein the second glass light guide in conjunction with the second light filtering agent is filtering at out least 50% of light in at least one light wavelength $\lambda a_2$ that propagates toward the second output grating; and wavelengths $\lambda a_1$, and $\lambda a_2$ are different from one another;

wherein the first and second light filtering agent comprise light absorbing dopants.

According to some embodiments, the light absorbing dopants of the first light filtering agent and of the second light filtering agent are selected from: $Er_2O_3$, $Ho_2O_3$, $Pr_2O_3$, $Nd_2O_3$, or $CeO_2$.

According to some embodiments the amount of $As_2O_3$ in the glass light guide(s) is between 0% to 0.1 wt %, e.g., 0 to 0.05 wt %.

According to some embodiments, a light guide device comprises:

(a) an input grating being structured and positioned to transmit light of one or more wavelengths to a glass light guide, the glass light guide structured to transmit light in one or more wavelengths within the glass light guide towards an output grating, along an optical path situated within the glass light guide between the input grating and the output grating, and (b) a light filtering agent situated within the glass light guide in the optical path, the glass light guide with the light filtering agent therein filtering out at least 50% of light in at least one light wavelength $\lambda a$ that propagates toward the output grating.

According to some embodiments, the glass light guide comprises greater than 0.03 wt % of at least one rare earth oxide having an atomic number of 58 or higher. According to some embodiments the glass light guide comprises at least one type of a light absorbing dopant within glass material of the light guide, light absorbing dopant being one of: $Er_2O_3$, $Ho_2O_3$, $Pr_2O_3$, $Nd_2O_3$, or $CeO_2$. According to some embodiments the wavelength $\lambda a$ is situated in 450 nm to 700 nm wavelength range, and the light glass light guide with the filtering agent therein absorbs at least 50% (e.g., at least 75%, at least 80%, at least 90%, or at least 95%) of light in the at least one light wavelength $\lambda a$ as the light propagates toward the output grating.

Figure 4:
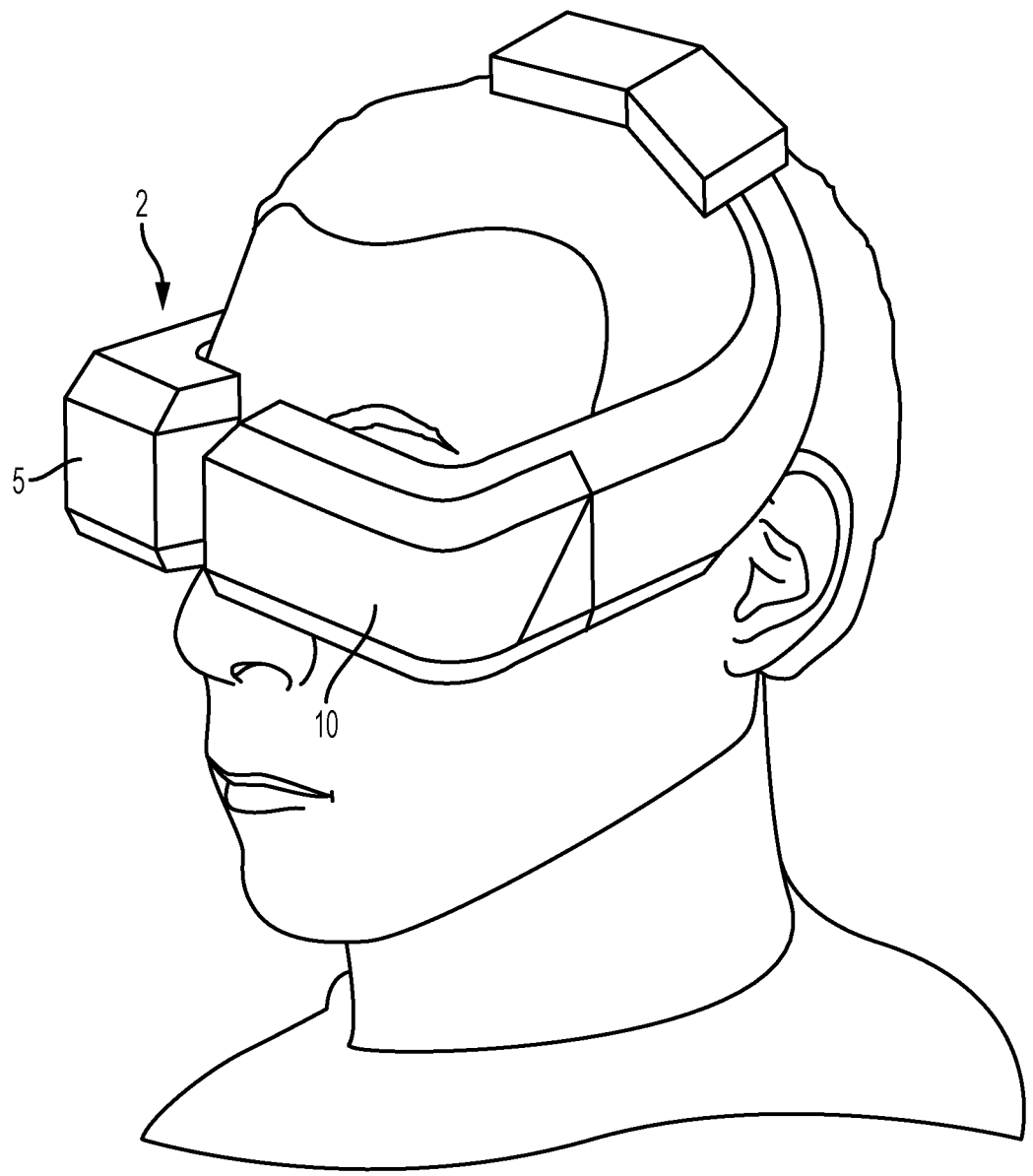
FIG. 4 illustrates another exemplary embodiment of lens for a wearable device.

According to one embodiment, as shown in FIG. 4, the wearable device 2 utilizes at least one lens 5 made of glass 10 capable of filtering at least one wavelength from the visible spectrum (i.e., the glass filters green, red or blue wavelength through absorption). According to at least one embodiment the glass 10 provides green light absorption at 520 nm wavelength (e.g., 520 nm+/−5 nm, or 520 nm+/−10 nm) of at least 50%, and according to some embodiments 75%, 80%, 85%, 90%, or 95% when propagating through a glass thickness of 50 mm, while providing a high transmission within another wavelength range of the visible spectrum (e.g., high red light transmission (at about 620 nm (e.g., 620 nm+/−5 nm, or 620 nm+/−10 nm). For example, in some embodiments, the transmission of the glass at the 620 nm wavelength is greater than 75%, or even greater than 80%, or greater than 90%. Preferably, the glass has an index of refraction $N_d$ (i.e., the refractive index N at the wavelength $\lambda$, where $\lambda$=587.6 nm) of the glass of lens 5 is at least 1.65, for example 1.7, 1.75, 1.8, 1.85, 1.9 or therebetween.

According to some embodiments the glass 10 comprises: a refractive index N of greater than 1.65 at $\lambda$=587.6 nm; glass density of not more than 4.2 g/cm$^3$; Abbe number $V_d$ greater than 30; and at least 0.01 wt % of rare earth oxide having an atomic number of 58 or higher, or transition metal oxide. Preferably the glass contains no more than 55 wt % of $SiO_2$ (e.g., 5-55 wt % $SiO_2$); and the amount of rare earth oxide with the atomic number $\geq$58 (e.g., $Er_2O_3$, $Nd_2O_3$, $CeO_2$, $Ho_2O_3$, or $Pr_2O_3$) is at least 0.05 wt % to provide the desired amount of absorption at one or more wavelengths $\lambda a$ within the visible spectrum. These glasses provide high absorption of light at selected wavelengths $\lambda a$, and high transmission at other wavelengths within the visible spectrum, when the thickness of the glass (in at least one plane) is 25 mm to 300 mm (e.g., at 50 mm thickness).

According to some embodiments the glass 10 has a refractive index $N_d$ of greater than 1.65 at 587.6 nm; glass density of not more than 4.2 g/cm$^3$ (e.g., 3 g/cm$^3$ to 4.05 g/cm$^3$, or 3.1 g/cm$^3$ to 4 g/cm$^3$); Abbe number $V_d$ greater than 30; and greater than 0.05 wt % of at least one rare earth oxide with the atomic number $\geq$58 (e.g., 58-71). Preferably, the amount of rare earth oxide is between 0.05 wt % and not more than 0.9% wt. For example, in some embodiments the rare earth oxide is $Er_2O_3$, and the amount of $Er_2O_3$ in the glass is between 0.05 wt % and not more than 0.8% wt %.

The rare earth oxide with the atomic number $\geq$58 may be, for example, $Er_2O_3$; $Pr_2O_3$; Ce oxide (e.g., $CeO_2$, $Ce_2O_3$), $Nd_2O_3$, or any combination thereof. In some embodiments the total amount of $Er_2O_3$; $Pr_2O_3$, $Ho_2O_3$, or $Nd_2O_3$, is between 0.1 wt % and 1.5 wt % (i.e., the amount of $Er_2O_3+Pr_2O_3+Ho_2O_3+Nd_2O_3$ is between 0.1 wt % and 1.5 wt %). The rare earth oxide is present in an amount such that it does not act as a discoloring agent in the glass lens, but acts as a specific wavelength filtering agent (for the wavelength $\lambda a$).

For example, the glass 10 may include, 0.1 wt % to 0.9 wt % $Er_2O_3$ and absorbs a significant amount (>50%, for example >60%, or even >70%) of light at 520 nm wavelength (when the glass thickness $TH_2$ is 25 mm or 50 mm), but this amount of $Er_2O_3$ does not significantly discolor the glass. At about 1 wt % to 2 wt % it can become a colorant, and may also may affect the overall transmission negatively, making the glass significantly less transparent in the visible wavelength range. This is also true for other rare earth oxides with the atomic number $\geq$58. These are earth oxides do not significantly affect the glass color in the glass 10 when present in the described wt % ranges, nor significantly lower overall glass transmission even for glass thicknesses of, for example, 25 mm or 50 mm, or 75 mm, but filter out (reduce transmission by 50%, or even 75% or 80%, or more light) for specific wavelength(s) λa within the visible spectrum. By not significantly lowering overall glass transmission we mean that the light transmission stays within 70% of the nominal transmission for this glass for at least a 50 mm (and preferably for at least a 75 nm) wavelength band within the visible spectrum, when compared to the same glass without the rare earth present in it, for glass that is 25 mm thick. For example, according to at least some embodiments of glass 10, for at least the 50 mm wavelength band within the visible spectrum, the 25 mm thick glass 10 has transmission that is at least 50%, and in some embodiments at least 80% or at least 90%) of the transmission in a similar glass (but without the rare earth present in it) that is also 25 mm thickness, when it is evaluated in the same spectral band.

For example, $Pr_2O_3$ doped glass 10 described herein (when light transmits through 25 mm and/or 50 mm thick glass 10) absorbs at least 70% of light at several wavelengths in the 450 nm to 475 nm wavelength band, while the glass maintains good transmission (75% and higher, and in some embodiments 80% or higher), for at least a 50 nm wavelength band within the 500 nm to about 560 nm range and/or within 625 nm to 700 nm wavelength range. This glass will also transmit most of the light through a 2 mm or less glass thickness, and the lens 5 made of the $Pr_2O_3$ doped glass 10 will appear colorless or nearly colorless to the end user.

According to some embodiments the glass 10 comprises: a refractive index N of greater than 1.65 at λ=587.6 nm; glass density of not more than 4.2 g/cm³ (for example less than 4.1 g/cm³, or 3 to 4.05 g/cm³); Abbe number $V_d$ greater than 30; the glass including at least 0.013 wt % of rare earth oxide with the atomic number ≥58; and further comprises in wt %, based on the oxides, with total weight percent adding to 100%:
  $SiO_2$, 5-55 wt %
  $ZrO_2$, 5-10 wt %;
  CaO 3.5-18 wt %;
  $La_2O_3$ 0.2 wt % to 30 wt %;
  $Nb_2O_5$ 0.5 wt % to 20 wt %;
  $TiO_2$ 5-20 wt %
  $As_2O_3$ 0% to 0.2 wt %; and
  $Er_2O_3$ 0.05% to 0.9 wt % (and preferably 0.1 to 0.9 wt %, for example, 0.1 to 0.8 wt %) and/or $Pr_2O_3$ 0.05% to 1 wt %; or $Nd_2O_3$ 0.05% to 1 wt %; or $Ho_2O_3$, 0.05% to 1 wt %, or Ce oxide ($CeO_2$) 0.05% to 1 wt %.

For example, the glass 10 having f the rare earth oxides with the atomic number ≥58 may include at least one of: $Pr_2O_3$ 0.05% to 0.9 wt %; $Ho_2O_3$ 0.05% to 0.9 wt % wt %; $Nd_2O_3$ 0.05% to 0.9 wt %; and/or Ce oxide 0.05% to 0.9 wt %.

Because pure silica has a refractive index Nd of about 1.5, keeping the amount of $SiO_2$ at 55% or below (e.g., 7-45 wt %) while adding higher index dopants (higher index constituents (dopants) allows the glass to be a high index glass (e.g. to have an index of refraction of 1.7 or greater) of high clarity and no significant coloring. If the amount of $SiO_2$ is increased to above 60%, higher index dopants or constituents will need to be added, which may result in a colored, rather than clear glass.

According to some embodiments, the total amount of $Er_2O_3$, $Nd_2O_3$, $Ho_2O_3$, Ce oxide, and $Pr_2O_3$ in the glass is less than 1.5 wt %, which helps to maintain clarity of the glass, and high transmissivity (transmission) at the desired wavelengths.

According to some embodiments the glass has a refractive index ($N_d$) of greater than 1.65 at the wavelength λ, where λ=587.6 nm; a density of more than 4.2 g/cm³ (for example less than 4.1 g/cm³, or 3 to 4.05 g/cm³), and comprises in wt %, based on the oxides, with total weight percent adding to 100%:
  $SiO_2$, 5-60 wt %
  $ZrO_2$, 5-10 wt %;
  CaO 3.5-18 wt %;
  $La_2O_3$ 0.2 wt % to 30 wt %;
  $Nb_2O_5$ 0.5 wt % to 20 wt %;
  $TiO_2$ 5-20 wt %
  $As_2O_3$ 0% to 0.2 wt %
  $Er_2O_3$ 0.01% to 0.5 wt % (e.g., 0.05 wt %-0.5 wt %, or 0.1 wt %-0.5 wt %)
  $Na_2O$ 2-5 wt %
  $K_2O$ 0-9 wt %;
  SrO 0 to 1 wt %;
  BaO 0-20 wt %;
  F 0-1 wt %;
  $B_2O_3$ 0-20 wt %.

According to some embodiments the glass comprises:
  $SiO_2$, 5-45 wt %
  $ZrO_2$, 5-9 wt %;
  $Na_2O$ 2-5 wt %
  $K_2O$ 4-9 wt %;
  CaO 4.5-16 wt %;
  SrO 0 to 1 wt %;
  BaO 10-20 wt %;
  $La_2O_3$ 1 wt % to 28 wt %;
  $Nb_2O_5$ 0.5 wt % to 20 wt %;
  $TiO_2$ 7-20 wt %
  F 0-1 wt %
  $As_2O_3$ 0% to 0.15 wt %
  $Er_2O_3$ 0.03% to 0.9 wt % (e.g., 0.05 wt %-0.5 wt %, or 0.1 wt %-0.5 wt %).

According to some embodiments the glass has a refractive index of greater than 1.65 at least one wavelength λ, where λ=587.6 nm; the glass having density of no more than 4.2 g/cm³ (for example less than 4.1 g/cm³, or 3 to 4.05 g/cm³), and comprises
  $SiO_2$, 20-55 wt %
  $ZrO_2$, 5-10 wt %;
  $Na_2O$ 2-5 wt %
  $K_2O$ 4-9 wt %;
  CaO 3.5-8.5 wt %;
  SrO 0 to 1 wt %;
  BaO 10-20 wt %;
  $La_2O_3$ 0.2 to 2 wt %;
  $Nb_2O_5$ 0.5 to 3 wt %;
  $TiO_2$ 12-20 wt %
  F 0-1 wt %.

The glass 10 may have 0% to 0.2 wt % of $As_2O_3$, for example 0% to 0.1 wt %. Preferably, and as shown in some embodiments, the amount of $As_2O_3$ is less than 0.1 wt %. In some embodiments, the amount of $Er_2O_3$ is 0.05% to 0.5 wt %, and the glass filters green light at the 520 nm wavelength.

According to some embodiments, a wearable device 2 such as eye glasses, goggles, or a helmet eye shield includes at least one lens 5 comprising glass 10 described herein. Such a device is shown, for example, in FIGS. 2 and 4. The wearable device 2 may include, for example, an opthalmic lens 5 that has a minimum glass thickness $TH_1$ between 0.5 and 3 mm, and a maximum glass thickness $TH_2$ of 25 mm to 300 mm, for example 45 mm to 125 mm (see, for example FIG. 1.) Preferably the density of glass 10 is below 4.1 g/cm³, or even less than 4.05 g/cm³, and in at least some embodiments 4 g/cm³ or less. Preferably, the thickness $TH_1$ of the glass (associated with each lens 5) is less than 1 mm, for example, 0.2 mm, 0.3 mm, 0.4 mm, 0.5 mm, 0.6 mm, 0.7 mm, 0.75 mm, 0.8 mm, 0.9 mm, or therebetween. Lowering light transmission at other wavelengths. Example 1A embodiment is a glass that is very similar to Example 1 glass, but the embodiment of Ex. 1A glass has 0.1 wt % Er instead of 0.25% wt % Er, and correspondingly a little more silica. The embodiments of Example 3A and 3B glasses are similar to the example 3 glass, but have more of $Er_2O_3$, and correspondingly slightly different amounts of silica.

TABLE 1

| Glass | Ex. 1 | Ex. 1A | Ex 2 | Ex 3 | Ex 3A | Ex 3B | Ex. 4 |
|---|---|---|---|---|---|---|---|
| Density (g/cm³) | 3.21 | 3.21 | 3.65 | 3.99 | 4.03 | 4.03 | 3.21 |
| Index (at 587.6 nm), | 1.7; | 1.7; | 1.8; | 1.9; | 1.88; | 1.88; | 1.7; 34.6 |
| Abbe-number (Vd) | 34.6 | 34.6 | 34.6 | 30.6 | 30.8 | 30.8 | |
| $SiO_2$ (wt %) | 40.35 | 40.5 | 28.6 | 7.4947 | 7.25 | 7.21 | 40.35 |
| $ZrO_2$ (wt %) | 8.70 | 8.70 | 5.5 | 8.246 | 8.2 | 8.2 | 8.70 |
| $Na_2O$ (wt %) | 3.11 | 3.11 | 0 | 0 | 0 | 0 | 3.11 |
| $K_2O$ (wt %) | 5.85 | 5.85 | 0 | 0 | 0 | 0 | 5.85 |
| CaO (wt %) | 5.20 | 5.20 | 15.25 | 12.564 | 12.5 | 12.5 | 5.20 |
| SrO (wt %) | 0.50 | 0.50 | 0 | 0 | 0 | 0 | 0.50 |
| BaO (wt %) | 16.30 | 16.30 | 0 | 0 | 0 | 0 | 16.30 |
| $La_2O_3$ (wt %) | 1.00 | 1.00 | 20.8 | 27.5 | 27.5 | 27.5 | 1.00 |
| $B_2O_3$ (wt %) | 0 | 0 | 2 | 16.5 | 16.85 | 16.85 | 0 |
| $Nb_2O_5$ (wt %) | 1.30 | 1.30 | 15.05 | 17.995 | 18 | 18 | 1.30 |
| $TiO_2$ (wt %) | 17.07 | 17.07 | 8.7 | 9.55 | 9.6 | 9.6 | 17.07 |
| F (wt %) | 0.22 | 0.22 | 0 | 0 | 0 | 0 | 0.22 |
| CoO (wt %) | 0 | 0 | 0 | 0.0003 | 0 | 0 | 0 |
| $Li_2O$ | 0 | 0 | 4 | 0 | 0 | 0 | 0 |
| $As_2O_3$ (wt %) | 0.15 | 0.15 | 0 | 0.05 | 0.05 | 0.05 | 0.02 |
| $Er_2O_3$ (wt %) | 0.25 | 0.1 | 0.1 | 0.1 | 0.05 | 0.9 | 0.3 |
| $Sb_2O_3$ (wt %) | 0 | 0 | 0 | 0 | 0 | 0 | 0.08 | the density and thickness $TH_1$ of the glass (and of the glass lens 5) while maintaining its optical properties reduces the weight of the glass, which advantageously reduces the weight of the wearable device 2, while maintaining glass clarity, and functionality (filtering characteristics at specified wavelengths λa and high overall transmission at other specified wavelengths within the visible spectrum). It is noted that advantageously, the lens 5 containing the glass 10 does not appear to be colored to a typical observer, while the glass still functions as a filter is at one or more wavelengths λa within the visible spectral range. (By functioning as a filter, it is meant that the glass transmits less than 50% of light (or absorbs more than 50%) at a specified wavelength λa, when the light at that wavelength propagates through a glass thickness within 25 mm to 150 mm range. Preferably, according to some embodiments, the glass 10 functions as a filter by transmitting less than 50% (or absorbs more than 50%) of light at a specified wavelength λa, when the light at that wavelength propagates through a glass thickness of 50 mm). A glass lens 5 embodiment utilized in a wearable augmented reality device 2 such as goggles or a helmet (as visor lens 5) may have, for example, the following dimensions: 0.2 mm-1.2 mm thick (i.e., 0.2 mm≤$TH_1$≤1.2 mm, by 20 to 60 mm wide (e.g., 30 mm to 50 mm wide), and 30 mm to 300 mm long (e.g., 30 mm to 150 mm long, 30 mm to 150 mm long, or 30 to 125 mm long). For example, in some embodiments the length of the lens 5 is 30 to 70 mm, accordingly, in such a wearable device, $TH_2$ may be, for example, 30 mm to 60 mm.

Various embodiments will be further clarified by the following examples.

Table 1 discloses compositions of five exemplary glass embodiments (Ex. 1, Ex 1A, and Ex 2, Ex 3, 3A 3B, and Ex. 4 glasses), their densities, refractive indices (Nd) measured at the sodium d line wavelength (587.6 nm), and their Abbe numbers ($V_d$). The glasses of Table 1 utilize Er to absorb light at 520 nm wavelength, while maintaining high level of These glass embodiments are suitable for use in ophthalmic lenses. Example 1 and 1A (Ex. 1, and 1A) glass has a linear coefficient of thermal expansion (CTE) of 76×10⁻⁷/° C., softening point of 800° C., and annealing point at 670° C. Example 2 (Ex. 2) glass has a linear coefficient of thermal expansion (CTE) of 91×10⁻⁷/° C., softening point of 732° C., and annealing point at 617° C.

The glass of example 3 (EX. 3) is also suitable for use in ophthalmic lenses. It has a linear expansion coefficient (CTE) of 75×10⁻⁷/° C., softening point of 750° C., and annealing point at 650° C. The Example 1-Example 4 glasses of Table 1 transmit most (>80%) of visible light situated within the 450 nm to 700 nm range when the light transmits through a 2 mm or less thickness of glass and will filter at least 75% of light at 520 nm wavelength when the 520 nm light transmits through a 50 mm thickness of glass. That is, The Example 1-Example 4 glasses of Table 1 absorb less than 20% (for example less than 10% or even less than 5%) of most of visible light when the light transmits through a 2 mm or less thickness of glass; and will absorb at least 25% of light at 520 nm wavelength when the 520 nm light transmits through a 50 mm thickness of glass.

Furthermore, for example, when the glass thickness is 50 mm, these glasses will filter (absorb) 80% of the light in 520 nm wavelength, and transmit at least 75% (or even 80% or more light in 575 nm to 625 nm wavelength. Also, for example, the glasses of Table 1, when the glass thickness is 25 mm, have an average transmission of at least 70%, and in some embodiments at least 80% within the wavelength range of 450 nm to 700 nm for a glass thickness of 25 mm, and a transmission of no more than 30% (and for some embodiments 25% or less) for at least the wavelength of 520 nm. That is, glasses of Table 1, when the glass thickness is 25 mm, absorb at least 25% (and for some embodiments 30% or more) for at least the wavelength of 520 nm.

Also, for example, the glasses of Table 1, when the glass thickness is 50 mm, have an average transmission of at least 80% within the wavelength range of 450 nm to 700 nm, and a transmission of 25% or less for at least the wavelength of 520 nm. The Example 1-4 glasses are highly transparent, and glass substrates that are 50 mm thick absorbs 75% or more light at a 520 nm wavelength and transmit more than 85% of light at a 620 nm wavelength. To a typical observer, these glasses appear clear, not colored.

Figure 5:
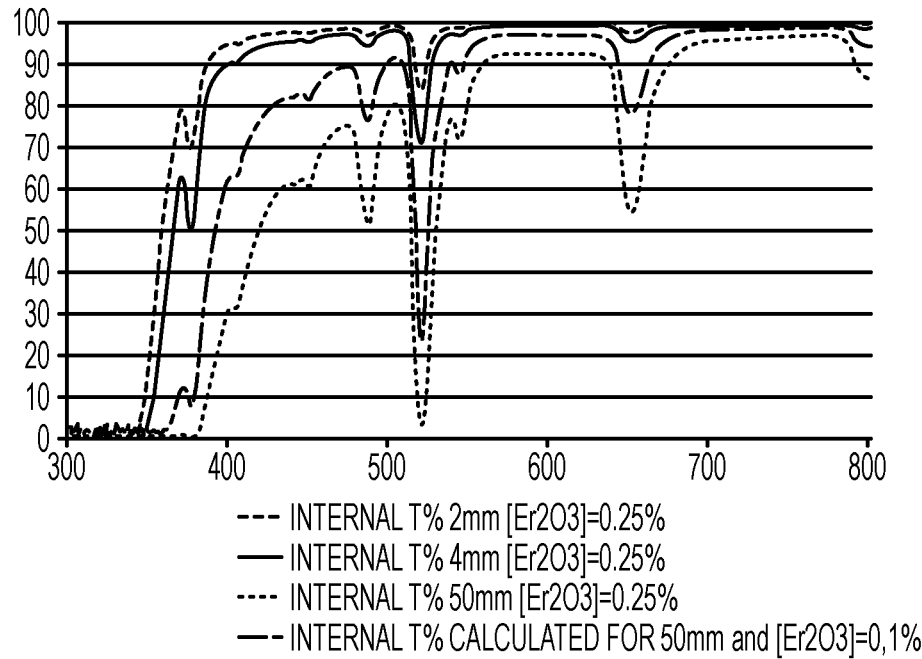
FIG. 5 illustrates internal transmission of the Er doped glass embodiments
Figure 6:
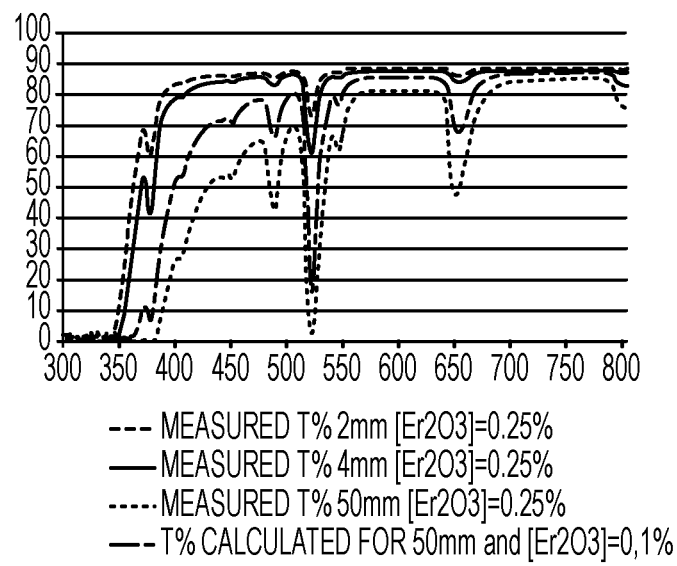
FIG. 6 illustrates measured transmission (including the reflection from the 2 end surfaces) of Er doped 1.7 refractive index glass embodiments corresponding to FIG. 5.

FIG. 5 illustrates an internal transmission T % (i.e., transmission without surface reflection effects) of the embodiments of the Ex. 1 and Ex. 1A glasses. More specifically, FIG. 5 illustrates that for a glass that has TH1 of 2 mm, transmission across the entire spectrum of 450 to 700 nm is very high, and that it is high even if the glass is 4 mm thick. However, for the glass lenses 5 incorporating glass 10 disclosed herein, the thickness TH1 is 1.2 mm or less, and the internal transmission across the visible spectrum is even higher. FIG. 5 also illustrates that when the glass 10 is 50 mm thick (TH2=50 mm), the light traveling through the glass thickness of 50 mm is strongly absorbed at the 520 nm wavelength. FIG. 6 illustrates measured transmission (with surface effects) of the same glass samples. The plot corresponding to 0.1 wt % Er doped glass (Ex 1A glass) indicates absorption of at least 75% at 520 nm wavelength. The plot corresponding to 0.25 wt % Er doped glass (Ex 1 glass) indicates an even higher absorption at the 520 nm wavelength. Table 2 provides internal transmission characteristics of these glasses. CT is the thickness of the glass (e.g., a thickness that may correspond to $TH_2$ of the lens(es) in the wearable device. In Table 2 internal glass transmission is denoted as T and shown in %. Please note that internal transmission T (%) equals 100% minus glass absorption (%), i.e., T (%)=100%–A (%).

TABLE 2

| Transmission T | Ex 1; $Er_2O_3$ = 0.25 wt % CT 50 mm | Ex 1A; $Er_2O_3$ = 0.1 wt % CT 50 mm |
|---|---|---|
| T % @ 520 nm | 5.1 | 20.2 |
| Internal T % @ 520 nm | 5.8 | 23.2 |
| T % @ 620 nm | 81.1 | 84.7 |
| Internal T % @ 620 nm | 92.5 | 96.9 |

Table 2 indicates that when the 50 mm thick glass contains 0.25% wt % of $Er_2O_3$, nearly 95% of light at the green wavelength (520 nm) is filtered (absorbed) and only about 6% of light at the wavelength of 520 nm is internally transmitted through the glass thickness of 50 mm, while at least 81% (e.g., at least 93%) of light at 620 nm wavelength is internally transmitted through the glass thickness of 50 mm. Table 2 also indicates that when the 50 mm thick glass contains 0.1% wt % of $Er_2O_3$, about 80% of light at the green wavelength (520 nm) is absorbed and only about 20% of the light in the 520 nm wavelength is internally transmitted through the glass thickness of 50 mm, while at least 85% (e.g., about 97% of light at 620 nm wavelength is internally transmitted through the glass thickness of 50 mm. However, when Ex. 1A glass is used in a lens that is 100 mm long ($TH_2$=100 mm), 80% or more of light in the green wavelength (520 nm) will be absorbed by the glass and at least 70% of light at 620 nm is transmitted through the glass thickness of 100 mm.

Table 3 provides transmission characteristics (where transmission is denoted as T and shown in %) of glass embodiments that are similar to the Example 1 glass. In this table $TH_2$ is the thickness of the glass (e.g., a thickness that may correspond to $TH_2$ of the lens(es) in the wearable device). More specifically the glass embodiments of Table 3 have $ErO_3$ in concentrations between 0.3 wt % and 0.9 wt %, and $TH_2$ between 30 and 130 mm. In Table 3 transmission is denoted as T and shown in %.

| Transmission T | Ex 1B; 0.05 wt % of $Er_2O_3$ $TH_2$ 100 mm | Ex 1C; 0.9 wt % of $Er_2O_3$ $TH_2$ 30 mm | Ex 1D; 0.03 wt % of $Er_2O_3$ $TH_2$ 130 mm | Ex 1A; 0.1 wt % of $Er_2O_3$ $TH_2$ 100 mm | Ex 1B; 0.05 wt % of $Er_2O_3$ $TH_2$ 125 mm |
|---|---|---|---|---|---|
| T % @ 520 nm | 20.4 | 0.1 | 28.1 | 4.8 | 14.2 |
| Internal T % @ 520 nm | 23.4 | 0.1 | 32.2 | 5.5 | 16.3 |
| T % @ 620 nm | 84.8 | 73.8 | 85.4 | 82., 2 | 84.1 |
| Internal T % @ 620 nm | 96.9 | 84.5 | 97.6 | 94 | 96.2 |
| T % @ 750 nm | 86.5 | 81.8 | 86.7 | 85.3 | 86.2 |
| Internal T % @ 750 nm | 98.7 | 93.5 | 98.9 | 97.4 | 98.3 |

Figure 7:
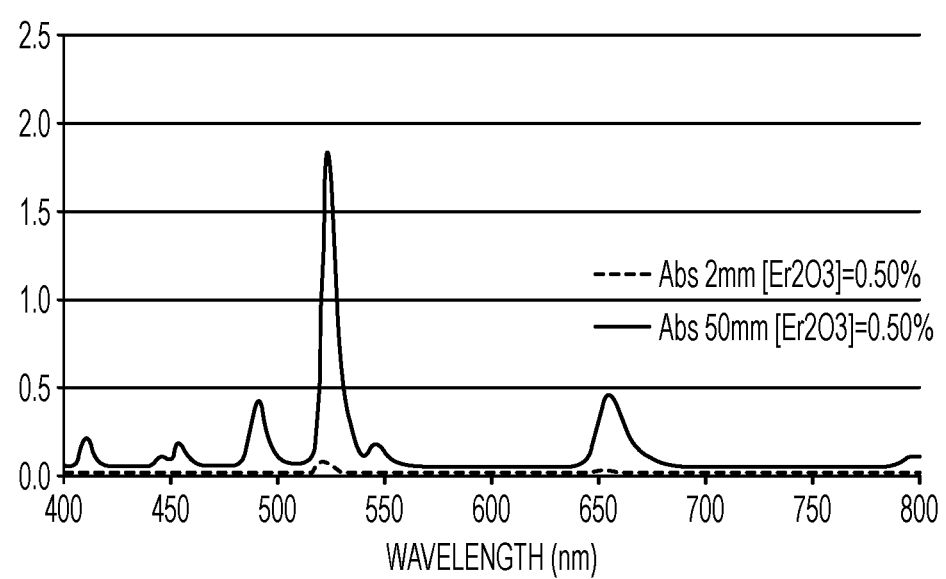
FIG. 7 illustrates modeled absorption (in log scale) of another embodiment of Er doped glass.

FIG. 7 illustrates a modeled absorption spectrum of Ex. 1E glass. This glass is similar to glasses of examples 1, A-1D, but has 0.5 wt % $Er_2O_3$. The absorption of this glass is plotted for the path length $TH_1$ of 2 mm and the path length of $TH_2$ of 50 mm is shown in a log scale of base 10. It illustrates that for glasses that are 2 mm thick or less ($TH_1 \leq 2$ mm) the absorption of light across the visible spectrum is minimal. However when the light passes through a glass thickness of about 50 mm ($TH_2$=50 mm), significant absorption occurs at 520 nm wavelength. The 520 nm absorption peak in FIG. 7 corresponds to absorption Amax of about 98.5%. It indicates that for this glass embodiment Amin of less than 1% at a wavelength of about 600 nm. Therefore, in this embodiment, Amax/Amin is greater than 90 (i.e., 98 or higher).

Table 4 discloses compositions of seven exemplary glass embodiments (Ex. 5-through Ex. 11 glasses), their densities, refractive indices ($N_d$) measured at 587.6 nm, and their Abbe numbers ($V_d$). These glasses, for example, utilize $Nd_2O_3$ and/or $Pr_2O_3$ to provide the filtering function (absorption) at the specified wavelengths.

TABLE 4

| Glass | Ex. 5 | Ex 6 | Ex 7 | Ex. 8 | Ex 9 | Ex 10 | Ex 11 |
|---|---|---|---|---|---|---|---|
| Density (g/cm³)) | 3.21 | 3.65 | 3.99 | 3.21 | 3.65 | 3.99 | 3.65 |
| Index (at 587.6 nm), Abbe-number (Vd) | 1.7; 34.6 | 1.8; 34.6 | 1.9; 30.6 | 1.7; 34.6 | 1.8; 34.6 | 1.9; 30.6 | 1.8; 34.6 |
| $SiO_2$ (wt %) | 40.35 | 28.6 | 7.4947 | 40.35 | 28.6 | 7.4947 | 28.6 |

TABLE 4-continued

| Glass | Ex. 5 | Ex 6 | Ex 7 | Ex. 8 | Ex 9 | Ex 10 | Ex 11 |
|---|---|---|---|---|---|---|---|
| $ZrO_2$ (wt %) | 8.70 | 5.5 | 8.246 | 8.70 | 5.5 | 8.246 | 5.5 |
| $Na_2O$ (wt %) | 3.11 | 0 | 0 | 3.11 | 0 | 0 | 0 |
| $K_2O$ (wt %) | 5.85 | 0 | 0 | 5.85 | 0 | 0 | 0 |
| CaO (wt %) | 5.20 | 15.25 | 12.564 | 5.20 | 15.25 | 12.564 | 15.25 |
| SrO (wt %) | 0.50 | 0 | 0 | 0.50 | 0 | 0 | 0 |
| BaO (wt %) | 16.30 | 0 | 0 | 16.30 | 0 | 0 | 0 |
| $La_2O_3$ (wt %) | 1.00 | 20.8 | 27.5 | 1.00 | 20.8 | 27.4 | 20.8 |
| $B_2O_3$ (wt %) | 0 | 2 | 16.5 | 0 | 2 | 16.5 | 2 |
| $Nb_2O_5$ (wt %) | 1.30 | 15.05 | 17.995 | 1.30 | 15.05 | 17.995 | 15.05 |
| $TiO_2$ (wt %) | 17.07 | 8.7 | 9.55 | 17.07 | 8.7 | 9.55 | 8.7 |
| F (wt %) | 0.22 | 0 | 0 | 0.22 | 0 | 0 | 0 |
| CoO (wt %) | 0 | 0 | 0.0003 | 0 | 0 | 0.0003 | 0 |
| $Li_2O$ | 0 | 4 | 0 | 0 | 3.75 | 0 | 4 |
| $As_2O_3$ (wt %) | 0.15 | 0 | 0.05 | 0.02 | 0 | 0.05 | 0 |
| $Pr_2O_3$, (wt %) | 0.25 | 0.1 | 0.1 | 0 | 0.1 | 0.1 | 0.05 |
| $Er_2O_3$ (wt %) | 0 | 0 | 0 | 0 | 0 | 0.1 | 0 |
| $Nd_2O_3$ (wt %) | 0 | 0 | 0 | 0.3 | 0.25 | 0 | 0 |
| $CeO_2$ | 0 | 0 | 0 | 0 | 0 | 0 | 0.05 |
| $Sb_2O_3$ (wt %) | 0 | 0 | 0 | 0.08 | 0 | 0 | 0 |

Figure 8:
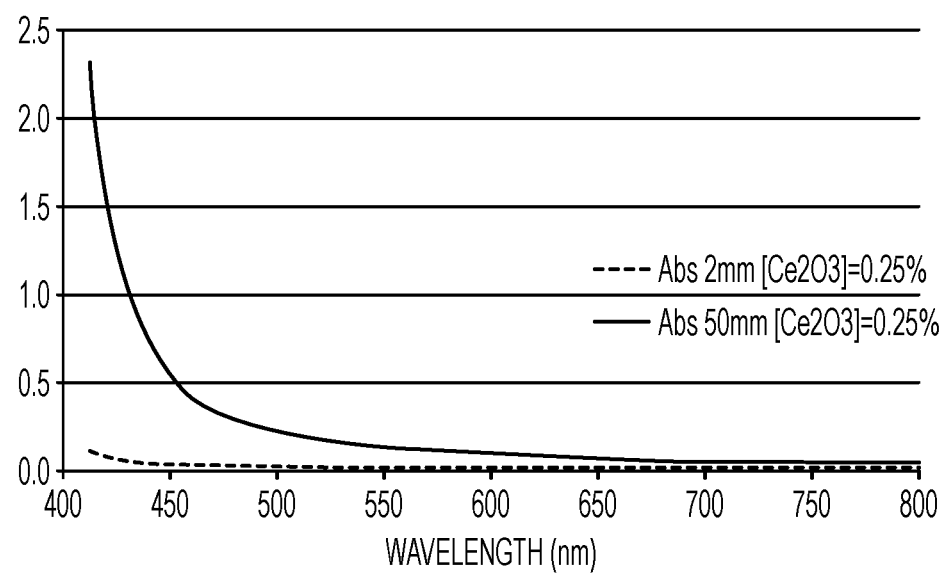
FIG. 8 illustrates modeled absorption (in log scale) of the glass embodiment that contains Ce oxide.

FIG. 8 illustrates a modeled absorption spectrum of Ex. 11A glass. This glass is similar to glass of EX. 11, but contains 0.25 wt % $Ce_2O_3$. The absorption of this glass is plotted for the path length $TH_1$ of 2 mm and the path length of $TH_2$ of 50 mm is shown in a log scale of base 10. It illustrates that for Ex. 11A glasses that are 2 mm thick or less ($TH_1 \leq 2$ mm) the absorption of light across the visible spectrum is minimal. However when the light passes through a glass thickness of about 50 mm ($TH_2$=50 mm), significant absorption occurs at 400 nm to 450 nm wavelength (blue wavelength). Accordingly, this glass acts as a blue filter when the light propagates through a thickness $TH_2$>25 mm (e.g., when $TH_2$ is between 30 mm and 150 mm). The graph illustrates absorption peak for this glass occurs at about 455 nm wavelength.

Figure 9:
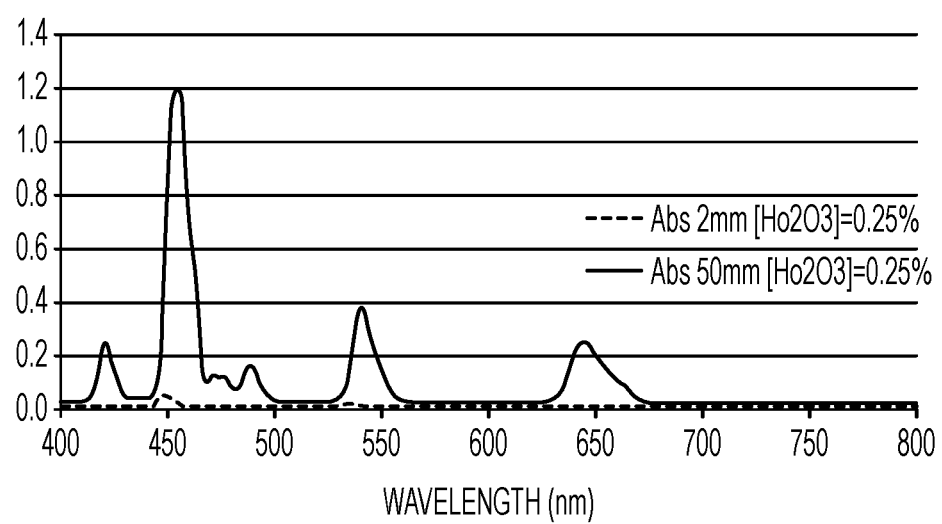
FIG. 9 illustrates modeled absorption (in log scale) of the glass embodiment that contains $Ho_2O_3$.

FIG. 9 illustrates a modeled absorption spectrum of Ex. 12 glass. This glass is similar to glass of example $Nd_2O_3$, but instead of $Nd_2O_3$ it contains 0.25 wt % $Ho_2O_3$. The absorption of this glass is plotted for the path length $TH_1$ of 2 mm and the path length of $TH_2$ of 50 mm is shown in a log scale of base 10. It illustrates that for Ex. 12 glasses that are 2 mm thick or less ($TH_1 \leq 2$ mm) the absorption of light across the visible spectrum is minimal. However, when the light passes through a glass thickness of about 50 mm ($TH_2$=50 mm), significant absorption occurs at 450 nm wavelength, and also has two smaller absorption peaks at about 540 nm and at about 650 nm wavelengths, while absorbing minimal amount of light at about 600 nm wavelength. Thus, EX. 12 glass has very high transmission of light (>90%) for at least a 50 nm wavelength band centered at about 600 nm)

Figure 10:
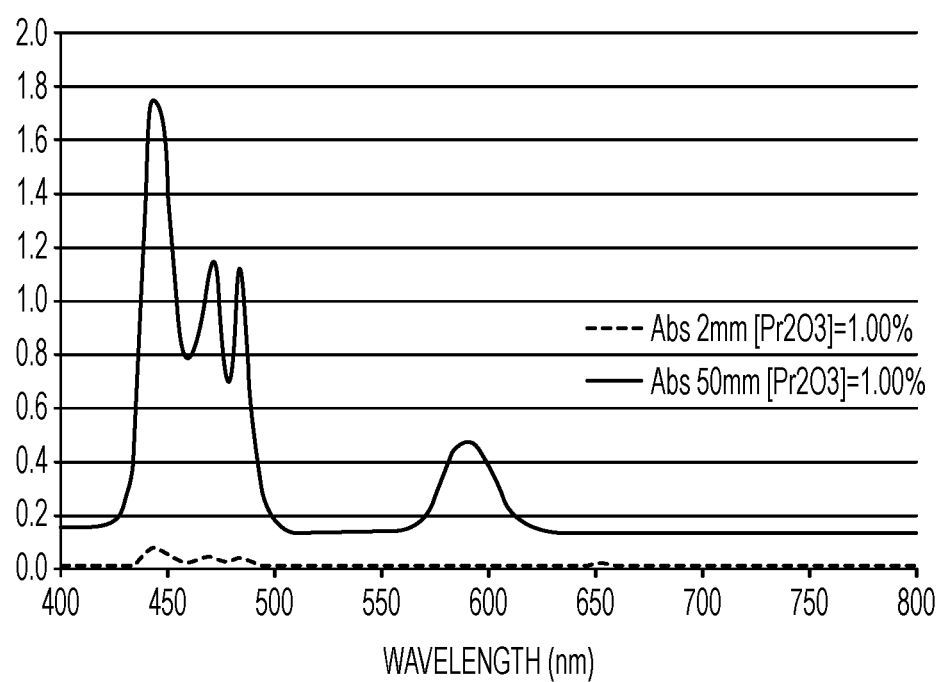
FIG. 10 illustrates modeled absorption (in log scale) of the glass embodiment that contains $Pr_2O_3$.

FIG. 10 illustrates a modeled absorption spectrum of Ex. 13 glass. This glass is similar to glass of Ex. 5 glass, but instead of 0.25 wt %, it contains 1 wt % of $Pr_2O_3$. The absorption of this glass is plotted for the path length $TH_1$ of 2 mm and the path length of $TH_2$ of 50 mm is shown in a log scale of base 10. It illustrates that for Ex. 5 glasses that are 2 mm thick or less ($TH_1 \leq 2$ mm) the absorption of light across the visible spectrum is minimal. However, when the light passes through a glass thickness of about 50 mm ($TH_2$=50) within a significant absorption occurs in 425-500 nm wavelength band, while the absorption of light within the 510 nm-560 nm wavelength band is minimized.

Figure 11:
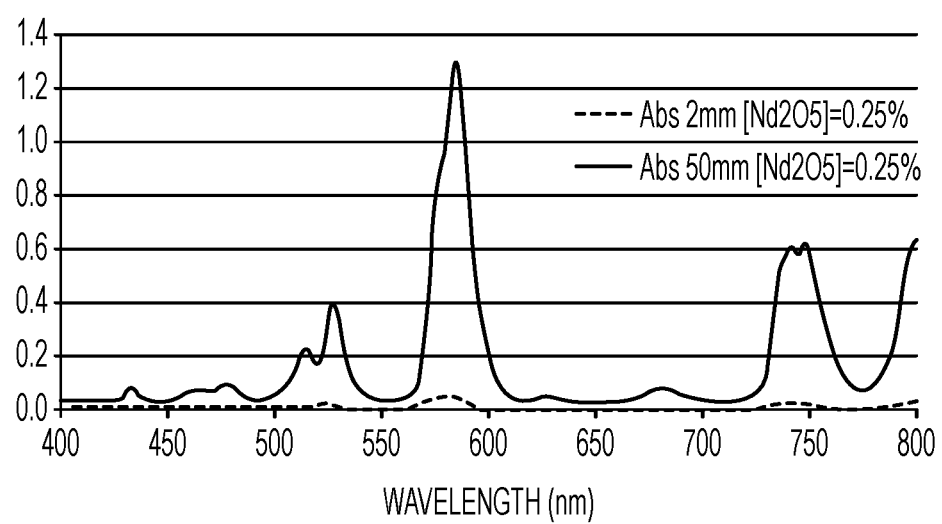
FIG. 11 illustrates modeled absorption (in log scale) of the glass embodiment that contains $Nd_2O_3$.

FIG. 11 illustrates a modeled absorption spectrum of Ex. 14 glass. This glass is similar to glass of Ex. glass, it contains 0.25 wt % of $Nd_2O_3$. The absorption of this glass is plotted for the path length $TH_1$ of 2 mm and the path length of $TH_2$ of 50 mm is shown in a log scale of base 10. It illustrates that for Ex. 5 glasses that are 2 mm thick or less ($TH_1 \leq 2$ mm) the absorption of light in a visible spectrum is minimal. However, when the light passes through a glass thickness of about 50 mm ($TH_2$=50) strong absorption (and thus filtering) occurs at about 580 nm wavelength, while absorption of light between 610 nm and 700 nm is minimized.

Table 5 discloses T max to Tmin ratios (labeled as T Ratio), and Amax to Amin ratios (labeled as A Ratio) at the specified wavelength, for the glasses 10 corresponding to FIGS. 7-11. In this Table 5, the wavelength Lambda Max, corresponds to the wavelength of the highest absorption peak for the specific glass 10.

| Absorbing Element | Filtering (absorbing) Color | Lambda Max | T Ratio | A Ratio |
|---|---|---|---|---|
| $Ce_2O_3$ | Blue | 412 nm | 188.6 | 48.9 |
| $Pr_2O_3$ | Blue | 443 nm | 41.3 | 13.2 |
| $Ho_2O_3$ | Blue | 452 nm | 15.1 | 54.4 |
| $Er_2O_3$ | Green | 521 nm | 62.6 | 43.1 |
| $Nd_2O_3$ | Green | 582 nm | 18.7 | 46.3 |

Thus, according to at least some embodiments the glass 10 has a minimum absorption Amin (%) for a wavelength within the wavelength range of 450 nm to 700 nm, and a maximum absorption Amax (%) for another wavelength within the visible wavelength range, and Amax/Amin is at least 2 for at least one glass thickness within the 25 mm to 150 mm range. According to at least some embodiment and Amax/Amin is at least 3, and preferably at least 4 (and in some embodiments at least 5, or even at least 9) when the light propagates through at least one glass thickness within the 25 mm to 150 mm range. For example, according to at least some embodiments 3<Amax/Amin<99 when the light propagates through a glass thickness that is in a 25 mm to 150 mm range. For example Amax/Amin may be 3, 5, 7.5, 8, 8.5, 9, 9.5, 10, 12, 15, 20, 30, 50, or higher when the light propagates through a thickness that is within the 25 mm to 150 mm range. The glass thickness may be, for example, 30 mm, 40 mm, 50 mm, 55 mm, 60 mm, 65 mm, 70 mm, 75 mm, 100 mm, 125 mm, or therebetween.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass comprising: a refractive index N of greater than 1.65 at a wavelength $\lambda$, where $\lambda=587.6$ nm; a glass density of not more than 4.2 g/cm$^3$; Abbe number $V_d$ greater than 30; the glass comprising in wt % based on the oxides, with total weight percent adding to 100%:
   SiO$_2$, 5-45 wt %;
   ZrO$_2$, 5-9 wt %;
   CaO 4.5-16 wt %;
   La$_2$O$_3$ 1 wt % to 28 wt %;
   Nb$_2$O$_5$ 0.5 wt % to 20 wt %;
   TiO$_2$ 7-20 wt %;
   As$_2$O$_3$ 0% to 0.15 wt %;
   Er$_2$O$_3$ 0.03% to 0.25 wt %;
   Na$_2$O 2-5 wt %;
   K$_2$O 4-9 wt %;
   Sr 0 to 1 wt %;
   BaO 10-20 wt %; and
   F 0-1 wt %.

2. The glass according to claim 1, further comprising 0.03 wt % to 0.05 wt % Er$_2$O$_3$.

3. The glass of claim 1, said glass comprising Er$_2$O$_3$ in the amount greater than 0.05 wt %.

4. The glass according to claim 1, comprising 0.05 wt % to 0.1 wt % Er$_2$O$_3$.

5. A glass comprising: a refractive index N of greater than 1.65 at a wavelength $\lambda$, where $\lambda=587.6$ nm; a glass density of not more than 4.2 g/cm$^3$; Abbe number $V_d$ greater than 30; the glass comprising the following components:
   SiO$_2$, 40.50 wt %;
   ZrO$_2$, 8.70 wt %;
   Na$_2$O 3.11 wt %;
   K$_2$O 5.85 wt %;
   CaO 5.20 wt %;
   SrO 0.5 wt %;
   BaO 16.30 wt %;
   La$_2$O$_3$ 1.0 wt %;
   Nb$_2$O$_5$ 1.30 wt %;
   TiO$_2$ 17.07 wt %;
   As$_2$O$_3$ 0.15 wt %;
   F 0.22 wt %, and
   Er$_2$O$_3$ 0.1 wt %;
   and,
   wherein the glass has a minimum absorption Amin (%) for a wavelength with a wavelength range of 450 nm to 700 nm, and a maximum Absorption Amax (%) for another wavelength within said wavelength range, and Amax/Amin is at least 2 for at least one glass thickness with a 25 mm to 125 mm range, wherein the total weight percent of the components adds up to 100%.

6. The glass according to claim 1 and further comprising As$_2$O$_3$ 0% to 0.05 wt %.

7. The glass of claim 1, wherein the glass has a maximum internal transmission Tmax (%) for a wavelength with a wavelength range of 450 nm to 700 nm, and a minimum internal transmission Tmin (%) for another wavelength within said wavelength range, and Tmax/Tmin is at least 2 for at least one glass thickness with a 25 mm to 125 mm range.

8. The glass of claim 1, wherein the glass has a minimum absorption Amin (%) for a wavelength with a wavelength range of 450 nm to 700 nm, and a maximum Absorption Amax (%) for another wavelength within said wavelength range, and Amax/Amin is at least 2 for at least one glass thickness with a 25 mm to 125 mm range.

9. A glass according to claim 1, wherein glass density is not greater than 4.05 g/cm$^3$.

10. The glass according to claim 1, wherein the refractive index is a refractive index N is $1.65<N\leq1.9$ at a wavelength $\lambda$, where $\lambda=587.6$.

11. A wearable device comprising the glass of claim 1.

12. A lens comprising the glass of claim 1.

13. A wearable device comprising the lens of claim 12.

14. The light guide device comprising:
   (a) a light guide comprising the glass of claim 1;
   (b) an input grating being structured and positioned to transmit light of one or more wavelengths to the glass light guide, and
   (c) an output grating;
      wherein the glass light guide is positioned and structured to transmit light in one or more wavelengths within the glass light guide towards an output grating, along an optical path situated within the glass light guide between the input grating and the output grating and to filter out at least 50% of light in at least one light wavelength $\lambda$a that propagates toward the output grating.

15. The glass according to claim 1 and further comprising As$_2$O$_3$ concentration in 0% wt % to 0.1 wt % range.

16. A glass having a refractive index of greater than 1.65 at a wavelength $\lambda$ of, and consisting of, in wt %, based on the oxides, with total weight percent adding to 100%:
   SiO$_2$, 40.35 wt %;
   ZrO$_2$, 8.70 wt %;
   Na$_2$O 3.11 wt %;
   K$_2$O 5.85 wt %;
   CaO 5.20 wt %;
   SrO 0.5 wt %;
   BaO 16.30 wt %;
   La$_2$O$_3$ 1.0 wt %;
   Nb$_2$O$_5$ 1.30 wt %;
   TiO$_2$ 17.07 wt %;
   As$_2$O$_3$ 0.15 wt %;
   F 0.22 wt %, and
   Er$_2$O$_3$ 0.25 wt %;
   wherein the glass has a minimum absorption Amin (%) for a wavelength with a wavelength range of 450 nm to 700 nm, and a maximum Absorption Amax (%) for another wavelength within said wavelength range, and Amax/Amin is at least 2 for at least one glass thickness with a 25 mm to 125 mm range.

* * * * *

UNITED STATES PATENT AND TRADEMARK OFFICE
CERTIFICATE OF CORRECTION

| | |
|---|---|
| PATENT NO. | : 10,815,145 B2 |
| APPLICATION NO. | : 15/465759 |
| DATED | : October 27, 2020 |
| INVENTOR(S) | : Yves Andre Henri Brocheton |

It is certified that error appears in the above-identified patent and that said Letters Patent is hereby corrected as shown below:

In the Claims

Column 19, Line 26, Claim 1, delete "0%" and insert -- 0 --, therefor.

Column 19, Line 30, Claim 1, delete "Sr" and insert -- SrO --, therefor.

Column 19, Line 35, Claim 3, delete "claim 1," and insert -- claim 1, wherein --, therefor.

Column 19, Line 37, Claim 4, delete "claim 1," and insert -- claim 1, further --, therefor.

Column 20, Line 41, Claim 15, delete "0%" and insert -- 0 --, therefor.

Signed and Sealed this
Sixth Day of December, 2022

Katherine Kelly Vidal
*Director of the United States Patent and Trademark Office*